Patented Sept. 26, 1939

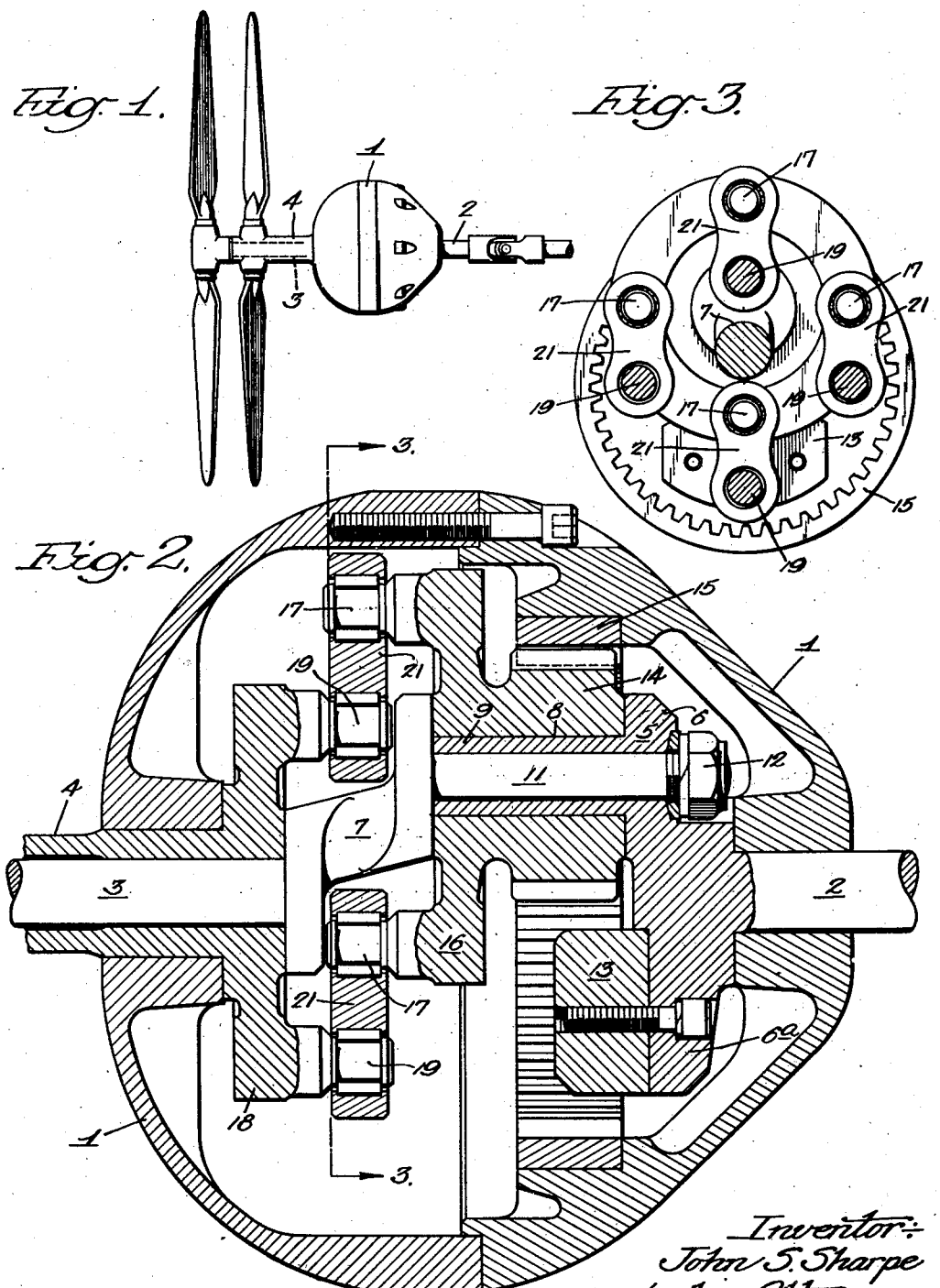

2,174,483

UNITED STATES PATENT OFFICE 2,174,483

TRANSMISSION

John S. Sharpe, Haverford, Pa.

Application October 11, 1938, Serial No. 234,442

6 Claims. (Cl. 74—307)

A principal object of this invention is to provide a transmission unit that shall be capable of transmitting power to two axially aligned propellers so as to drive the propellers at uniform speeds in opposite directions.

More broadly stated, an object of the invention is to provide a transmission unit which will drive two coaxially arranged driven shafts from a common drive shaft in opposite directions and at the same or at established differing rates of speed, the connection between the drive shaft and each of said driven shafts being positive and thereby affording a fixed rotational relation between the two driven shafts.

It has previously been proposed to provide aircraft with two axially aligned propellers, and to exert torques tending to drive these propellers in opposite directions through the medium of a differential transmission mechanism. This method of driving oppositely rotating propellers has certain useful features, but lacks utility in military aircraft wherein it is necessary to have a synchronized relation between a machine gun firing through the propeller disk area and the movement of the propellers, the use of a differential mechanism between the two propellers precluding such synchronization. While it is entirely practical, without consideration of size and weight, to produce a transmission mechanism which will drive two propellers synchronously in opposite directions, the difficulty has been to provide a transmission of this character meeting the requirements for aircraft usage as to lightness of weight and compactness of form. By the present invention, I have provided a mechanism which meets in full degree all the requirements, inclusive of compactness of form, lightness of weight, simplicity and ruggedness of construction and ability to withstand the widely variable torque conditions met in aircraft practice.

In the attached drawing:

Figure 1 is a side view of a transmission made in accordance with my invention;

Fig. 2 is an enlarged sectional view of the transmission, and

Fig. 3 is a reduced section on the line 3—3, Fig. 2.

With the reference to the drawing, the transmission comprises a relatively fixed casing 1 embracing the entire mechanism of the unit; a drive shaft 2 which enters one end of the casing, and driven shafts 3 and 4 which pass through the opposite side of the casing and which are axially aligned with the drive shaft 2. The driven shaft 3 is in effect a relatively fixed part of the drive shaft 2, being connected to the drive shaft by a crank, indicated generally by the reference numeral 5, and consisting of two crank arms 6 and 7, on the drive and driven shafts respectively, and a crank pin 8 which unites said arms. The crank pin 8 in the present instance consists of an outer sleeve 9 formed integrally with the crank arm 6, and a pin 11 which is formed integrally with the crank arm 7 and which extends through the sleeve 9, the outer end of the pin 11 being threaded for reception of a nut 12 which secures the two parts together. It will be noted that the extension 6a of the crank arm 6 carries at its inner side a counterweight 13.

Journaled on the crank pin 8 is a gear pinion 14, and this pinion meshes with an internal gear 15 mounted in and fixed with relation to the casing 1. The pinion 14 has at one end an integral flange 16 which is provided with a plurality of transversely projecting crank pins 17, these pins being four in number in the present instance, and being uniformly spaced with respect to the axis of the pinion. The driven shaft 4 has at its inner end a corresponding flange 18, and this flange is provided with a corresponding set of transversely projecting crank pins 19 which are uniformly spaced with respect to the axis of the shaft 4. The pins 17 of the flange 16 are connected, respectively, to the pins 19 of the flange 18 by means of links 21, which thereby establish a driving connection between the pinion 14 and the shaft 4.

It will be apparent that for each rotation of the shaft 2 the driven shaft 3, which is fixed with respect thereto, will be given a corresponding rotation in the same direction. It will be apparent also that the rotation of the shafts 2 and 3 will cause a tracking of the pinion 14 around the internal gear 15 and a resulting rotation of the pinion 14 about its own axis in a direction opposite to the direction of rotation of the shafts 2 and 3. One of the characteristics of the aforesaid driving connection between the pinion 14 and the shaft 4 is that rotation of one of the elements about its axis will be accompanied by a corresponding rotation of the other element about its own axis and in the same direction. Thus as the pinion 14 tracks around the internal gear 15 as previously described, and is thereby given a rotation about its own axis in a direction opposite to the direction of its orbital movement in the internal gear, the shaft 4 will be given a corresponding rotation in the same direction, which is opposite to the direction of rotation of the shafts 2 and 3. By giving the pinion 14 a diameter equal to half that of the diameter of the internal gear 15, the gear 14 for each full rotation of the shafts 2 and 3 will be given a corresponding complete rotation about its own axis on the crank pin 8, and since this full rotation of the gear 14 is accompanied by a corresponding full rotation in the same direction of the shaft 4, it will be apparent that the shafts 3 and 4 will be driven in opposite directions and at the same rate of speed.

It will be apparent further that by changing the ratio of the diameters of the gear pinion 14 and the internal gear 15, the ratio of the driven speeds of the shafts 3 and 4 may be similarly varied either way from the unity relation which they have in the illustrated embodiment. While the ratio of the speeds of the driven shafts may thus be varied, it is to be noted that in every instance the ratio is constant, there being an established relation between the movements of the two propellers.

The transmission described above is characterized by extreme compactness of form and mechanical simplicity. The mechanism involving a minimum of moving parts inclusive of but two gears, 14 and 15, is relatively light of weight, and is extremely rugged and durable. The transmission further provides for transmission of power from the driving to the driven shafts under uniform torque conditions, and, being capable of both static and dynamic balance, is well adapted for aircraft purposes.

I claim:

1. A transmission unit comprising two axially aligned shaft elements and a crank interposed between and rigidly uniting said elements, a third shaft element coaxially embracing one of the elements first named, a gear pinion journaled on said crank, a relatively fixed internal gear concentric with the common axis of said shaft elements and meshing with said pinion, and means for operatively connecting said pinion with said third shaft element so that a rotation of either of said pinion or element about its axis will be accompanied by a corresponding rotation of the other about its own axis and in the same direction, said connecting means being flexible to compensate the axial misalignment of said shaft element and pinion and to permit movement of said pinion in its orbital path.

2. A transmission unit comprising two axially aligned shaft elements and a crank interposed between and rigidly uniting said elements, a third shaft element coaxially embracing one of the elements first named, a planetary assembly comprising a planetary element journaled on said crank and a coactive relatively fixed orbital element, and means for operatively connecting said planetary element with said third shaft element so that a rotation of either of said pinion or element about its axis will be accompanied by a corresponding rotation of the other about its own axis and in the same direction, said connecting means being flexible to compensate the axial misalignment of said shaft element and pinion and to permit movement of said pinion in its orbital path.

3. A transmission unit comprising two axially aligned shaft elements and a crank interposed between and rigidly uniting said elements, a third shaft element coaxially embracing one of the elements first named, a planetary assembly comprising a planetary element journaled on said crank and a coactive relatively fixed orbital element, and means for operatively connecting said planetary element with said third shaft element so that a rotation of either of said elements about its axis will be accompanied by a corresponding rotation of the other element about its own axis in the same direction, said connecting means being flexible to compensate the axial misalignment of said shaft and planetary elements and to permit movement of said planetary element in its orbital path.

4. A transmission unit comprising two axially aligned shaft elements and a crank interposed between and rigidly uniting said elements, a third shaft element coaxially embracing one of the elements first named, a gear pinion journaled on said crank, a relatively fixed internal gear concentric with the common axis of said shaft elements and meshing with said pinion, and means for operatively connecting said pinion with said third shaft element so that a rotation of either of said pinion or element about its axis will be accompanied by a corresponding rotation of the other about its own axis in the same direction, said connecting means being flexible to compensate the axial misalignment of said shaft element and pinion and to permit movement of said pinion in its orbital path.

5. A transmission unit comprising two axially aligned shaft elements and a crank interposed between and rigidly uniting said elements, a third shaft element coaxially embracing one of the elements first named, a planetary assembly comprising a planetary element journaled on said crank and a coactive relatively fixed orbital element having an effective diameter twice as great as the effective diameter of said planetary element, and means for operatively connecting said planetary element with said third shaft element so that a rotation of either of said elements about its axis will be accompanied by a corresponding rotation of the other element about its own axis and in the same direction, said connecting means being flexible to compensate the axial misalignment of said shaft and planetary elements and to permit movement of said planetary element in its orbital path, and the effective diameter of said planetary element being one-half that of said orbital element whereby the speed of rotation of said third shaft element corresponds to the speed of rotation of said first and second shaft elements.

6. A transmission unit comprising two axially aligned shaft elements and a crank interposed between and rigidly uniting said elements, a third shaft element coaxially embracing one of the elements first named, a planetary assembly comprising a planetary element journaled on said crank and a coactive relatively fixed orbital element, a plurality of cranks on said planetary element arranged in annular series concentric with the rotary axis of said element, a corresponding set of cranks on said third shaft element, and links connecting the cranks of said planetary element respectively with the cranks of said third shaft element, said links forming an operative connection between said planetary element and the third shaft element wherein a rotation about its axis of either element is accompanied by a corresponding rotation of the other element about its own axis and in the same direction, said operative connection compensating the axial misalignment of said elements and permitting movement of said planetary element in its orbital path.

JOHN S. SHARPE.